(12) United States Patent
Gilles

(10) Patent No.: US 7,549,243 B1
(45) Date of Patent: Jun. 23, 2009

(54) LAWN MOWER ATTACHMENT MECHANISM

(75) Inventor: Jeremy Gilles, Malone, WI (US)

(73) Assignee: Ariens Company, Brillion, WI (US)

( * ) Notice: Subject to any disclaimer, the term of this patent is extended or adjusted under 35 U.S.C. 154(b) by 9 days.

(21) Appl. No.: 12/014,524

(22) Filed: Jan. 15, 2008

(51) Int. Cl.
*E02F 3/96* (2006.01)

(52) U.S. Cl. .......................... 37/468; 414/723; 403/321

(58) Field of Classification Search ................ 403/321, 403/322.1, 322.4; 414/723, 724; 172/439, 172/449, 451; 37/468, 403, 231, 440; 56/14.9, 56/15.7, 15.6, DIG. 14
See application file for complete search history.

(56) References Cited

U.S. PATENT DOCUMENTS

| | | | | |
|---|---|---|---|---|
| 4,436,447 A | * | 3/1984 | Lenertz et al. | 414/723 |
| 4,747,257 A | | 5/1988 | Hutchison | |
| 4,812,103 A | * | 3/1989 | Cochran et al. | 414/723 |
| 4,864,805 A | | 9/1989 | Hager et al. | |
| 4,920,732 A | | 5/1990 | Lee et al. | |
| 4,982,762 A | | 1/1991 | Lee et al. | |
| 5,078,569 A | * | 1/1992 | Cook | 414/723 |
| 5,474,315 A | | 12/1995 | Klas et al. | |
| 5,570,570 A | | 11/1996 | Klas et al. | |
| 5,692,855 A | * | 12/1997 | Burton | 403/325 |
| 5,784,867 A | | 7/1998 | McFarland et al. | |
| 5,803,474 A | | 9/1998 | Klas et al. | |
| 5,820,332 A | * | 10/1998 | Philips et al. | 414/723 |
| 5,865,020 A | | 2/1999 | Busboom et al. | |
| 6,336,785 B1 | * | 1/2002 | Kunzman | 414/723 |
| 6,350,079 B1 | * | 2/2002 | Williams | 403/326 |
| 6,354,383 B1 | | 3/2002 | Muilenburg | |
| 6,405,514 B1 | | 6/2002 | Guertin | |
| 6,481,124 B1 | * | 11/2002 | Miller et al. | 37/468 |
| 6,526,677 B1 | * | 3/2003 | Bloxdorf et al. | 37/231 |
| 6,594,924 B2 | * | 7/2003 | Curtis | 37/231 |
| 6,722,113 B2 | | 4/2004 | Atterbury et al. | |
| 6,902,346 B2 | * | 6/2005 | Steig et al. | 403/322.3 |
| 6,928,757 B2 | * | 8/2005 | Bloxdorf et al. | 37/231 |
| 6,983,583 B2 | | 1/2006 | Bucher | |
| 7,014,385 B2 | * | 3/2006 | Lim et al. | 403/322.4 |
| 2006/0174599 A1 | | 8/2006 | Hironimus | |

* cited by examiner

*Primary Examiner*—Árpád Fábián-Kovács
(74) *Attorney, Agent, or Firm*—Michael Best & Friedrich LLP

(57) ABSTRACT

An apparatus for connecting an attachment to a vehicle includes first and second mounting pegs mounted to one of the attachment and vehicle, a mounting arm having first and second cut-outs sized and spaced to receive the respective first and second mounting pegs, and first and second latches that are pivotable to trap the mounting pegs in the cut-outs. The apparatus further includes a detent mechanism resiliently holding the first latch in each of the latched and unlatched positions with a detent force. An over-center biasing mechanism provides a biasing force along a line of force, and urges the second latch into the latched and unlatched positions in response to the line of force being on one side of the pivot axis or the other.

12 Claims, 9 Drawing Sheets

LAWN MOWER ATTACHMENT MECHANISM

BACKGROUND

The present invention relates to a lawn mower or other vehicle having an attachment mechanism for a front-mounted mower or other attachment.

SUMMARY

In one embodiment, the invention provides an apparatus for connecting an attachment to a vehicle, the apparatus comprising: first and second mounting pegs mounted to one of the attachment and vehicle; a mounting arm having first and second cut-outs sized and spaced to receive the respective first and second mounting pegs; a first latch pivotable between a latched position in which the first mounting peg is trapped in the first cut-out, and an unlatched position in which the first mounting peg is removable from the first cut-out; a second latch pivotable about a pivot axis between a latched position in which the second mounting peg is trapped in the second cut-out, and an unlatched position in which the second mounting peg is removable from the second cut-out; a detent mechanism resiliently holding the first latch in each of the latched and unlatched positions with a detent force; and an over-center biasing mechanism providing a biasing force along a line of force, the biasing force urging the second latch into the latched position in response to the line of force being on one side of the pivot axis and urging the second latch into the unlatched position in response to the line of force being on an opposite side of the pivot axis.

In some embodiments, the first cut-out opens forwardly and the second cut-out opens downwardly.

In some embodiments, the detent mechanism includes a deflectable member; a first detent groove in which the deflectable member is positioned in response to the first latch being in the latched position; and a second detent groove in which the deflectable member is positioned in response to the first latch being in the unlatched position; wherein the deflectable member resists movement out of the first and second detent grooves to resist movement of the first latch between the latched and unlatched positions; and wherein a manual pivoting force applied to the first latch overcomes the resistance to cause the deflectable member to ride out of one of the first and second detent grooves and into the other of the first and second detent grooves during manual adjustment of the first latch between the latched and unlatched positions.

In some embodiments, the deflectable member includes a detent spring.

In some embodiments, the over-center biasing mechanism includes an over-center link connected at a first end to the second latch; and a biasing spring connected to a second end of the link opposite the first end; the biasing spring generates the biasing force directed along a line of force between the first and second ends of the link; and pivoting the second latch moves the line of force across the pivot axis. In some embodiments, the over-center link is non-linear, such that the line of force does not extend along the over-center link.

In some embodiments, the second latch includes a cam surface and operational hook; the second mounting peg is received within the operational hook by abutting the second mounting peg against the cam surface to deflect the second latch out of the latched position against the biasing force but not into the unlatched position as the mounting peg is moved into the second latch; and the biasing mechanism biases the second latch into the latched position to engage the second mounting peg with the operational hook in response to the second mounting peg clearing cam surface. In some embodiments, the second latch includes a reset hook, a reset jaw, and a slot between the reset jaw and the operational hook; the second mounting peg is moved into engagement with reset hook in response to the second latch moving into the unlatched position; the second mounting peg moves along the reset jaw and causes the second latch to move out of unlatched position toward latched position in response to moving the second mounting peg out of the second cut-out; and the biasing mechanism moves the second latch toward the latched position with the second mounting peg in the slot in response to the second mounting peg moving along reset jaw out of second cut-out.

In some embodiments, the mounting arm is a first mounting arm; the apparatus further comprises a second mounting arm; and the first and second latches, the detent mechanism, and the over-center mechanism are positioned between the first and second mounting arms. The detent mechanism may include a deflectable member extending between the first and second mounting arms and applying a detent force to the first latch to resist movement of the first latch out of the latched and unlatched positions; and wherein the detent force is overcome by manual pivoting of the first latch between the latched and unlatched. The detent mechanism may further include first and second detent grooves into which the deflectable member is received in response to the first latch being in the respective latched and unlatched positions.

In some embodiments, the first latch includes a lever for facilitating application of a manual pivoting force to the first latch to overcome the detent force and moving the first latch between the latched and unlatched positions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
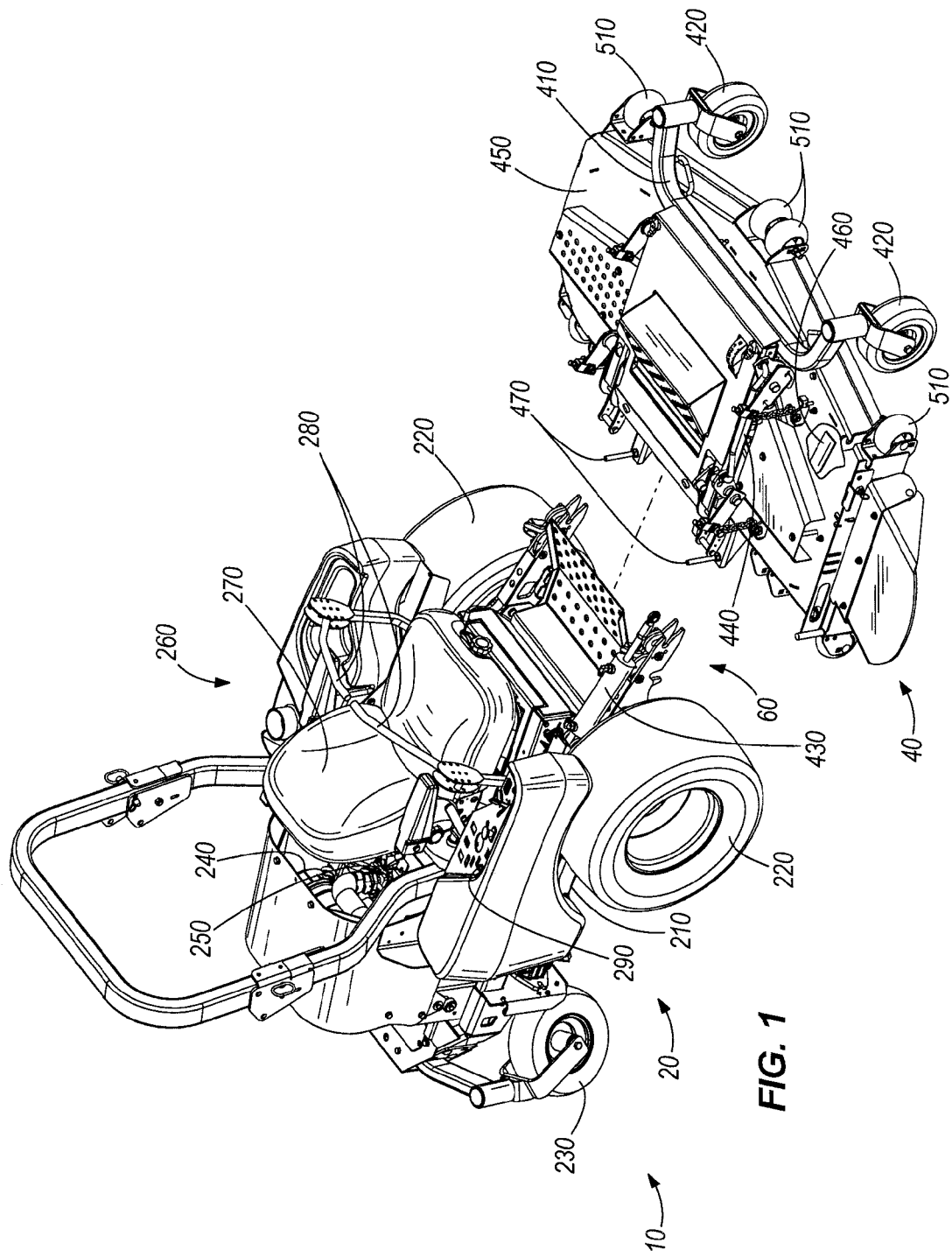
FIG. 1 is a perspective view of a lawn mower embodying the present invention and including a tractor, a mower attachment, and a weight transfer assembly.

As shown in FIG. 1, a lawn mower 10 generally includes a tractor 20, a mower attachment 40, and a weight transfer assembly 60 between the tractor 20 and mower attachment 40. The terms "front," "forward," "rear," "rearward," "left," "right," derivatives of those terms, and any other terms used in a positional or directional sense are used herein from the perspective of an operator seated in the lawn mower 10 during ordinary operation of the lawn mower 10.

Tractor

The tractor 20 includes a tractor frame or chassis 210, front drive wheels 220, rear caster wheels 230, a prime mover 240, a hydraulic system 250, and an operator zone or operator station 260. The tractor frame 210 is supported by the front and rear wheels 220, 230, and in turn supports the prime mover 240, hydraulic system 250, and operator zone 260. Although the illustrated embodiment includes wheels 220, 230, other embodiments may utilize other traction members, such as tracks, for example. The prime mover 240 may in some embodiments include an internal combustion engine, an AC or DC electric power source, a fuel cell, a hybrid power source, or any other suitable power source. The prime mover 240 drives operation of the hydraulic system 250, which in turn (as will be discussed below) operates various systems in the lawn mower 10.

The operator zone 260 includes a seat 270 for an operator, left and right control sticks or levers 280, and a control panel 290. The seat 270 is positioned to allow an operator to reach steering controls, engine controls, and any other controls that may be used during operation of the lawn mower 10. In this regard, the terms "operator zone" and "operator station" include the seat 270 and all controls (including the control sticks 280 and controls on the control panel 290) accessible by the operator while seated during normal operation of the lawn mower 10.

The left and right control sticks 280 control the speed and direction of rotation of the front wheels 220 through the hydraulic system 250. Pushing both control sticks 280 forward causes forward rotation of the front wheels 220 and forward movement of the tractor 20, and pulling both control sticks 280 rearward causes reverse rotation of the front wheels 220 and reverse movement of the tractor 20. Any difference in forward and rearward movement of the control sticks 280 results in a difference in speed of rotation of the front wheels 220 and results in the tractor 20 turning left or right about a turning radius that is a function of the difference in control stick movement. Pushing one of the control sticks 280 forward while pulling the other control stick 280 rearward results in one of the front wheels 220 rotating in a forward direction while the other front wheel 220 rotates backward, which permits the tractor 20 to turn on a substantially zero radius. Hence the tractor 20 and overall lawn mower 10 of the illustrated embodiment is sometimes referred to in the art as a "zero turn radius," "ZTR," or "trans-steer" tractor or lawn mower. The control panel 290 in the operator zone 260 includes a plurality of switches, including an ignition switch for starting the prime mover, a deck lift switch for actuating the deck lift actuator through the hydraulic system 250, and a weight transfer switch or dial to operate the weight transfer assembly 60 through the hydraulic system 250.

It should be noted that although the illustrated embodiment includes a ZTR riding lawn mower 10, the invention described herein is also suited for use on other types of vehicles. For example, the present invention may be embodied in a non-ZTR riding lawn mower (e.g., a lawn tractor with steering wheel), a walk-behind lawn mower, a construction vehicle, a utility vehicle, a turf-maintenance vehicle, golf carts, and other off-road vehicles. In walk-behind applications (such as walk-behind mowers), the operator zone 260 is the area occupied by the operator during ordinary use of the device. All possible ride-on vehicles and walk-behind implements in which the present invention may be embodied are encompassed by the term "vehicle" in this disclosure.

Mower Attachment

The mower attachment 40 includes a deck frame or attachment frame 410 supported by mower attachment wheels 420, a deck lift actuator 430, a deck lift linkage 440, a cutting enclosure 450, and a plurality of cutting blades 460 under the cutting enclosure 450. The mower attachment has an attachment weight, a portion of which (i.e., that portion transferred to the front wheels 220 as will be explained below) may be referred to as the transfer weight. Vertical stop members 470 are mounted to rear portions of the deck frame 410 and extend vertically under portions of the weight transfer assembly 60 (as will be discussed below).

Figure 2:
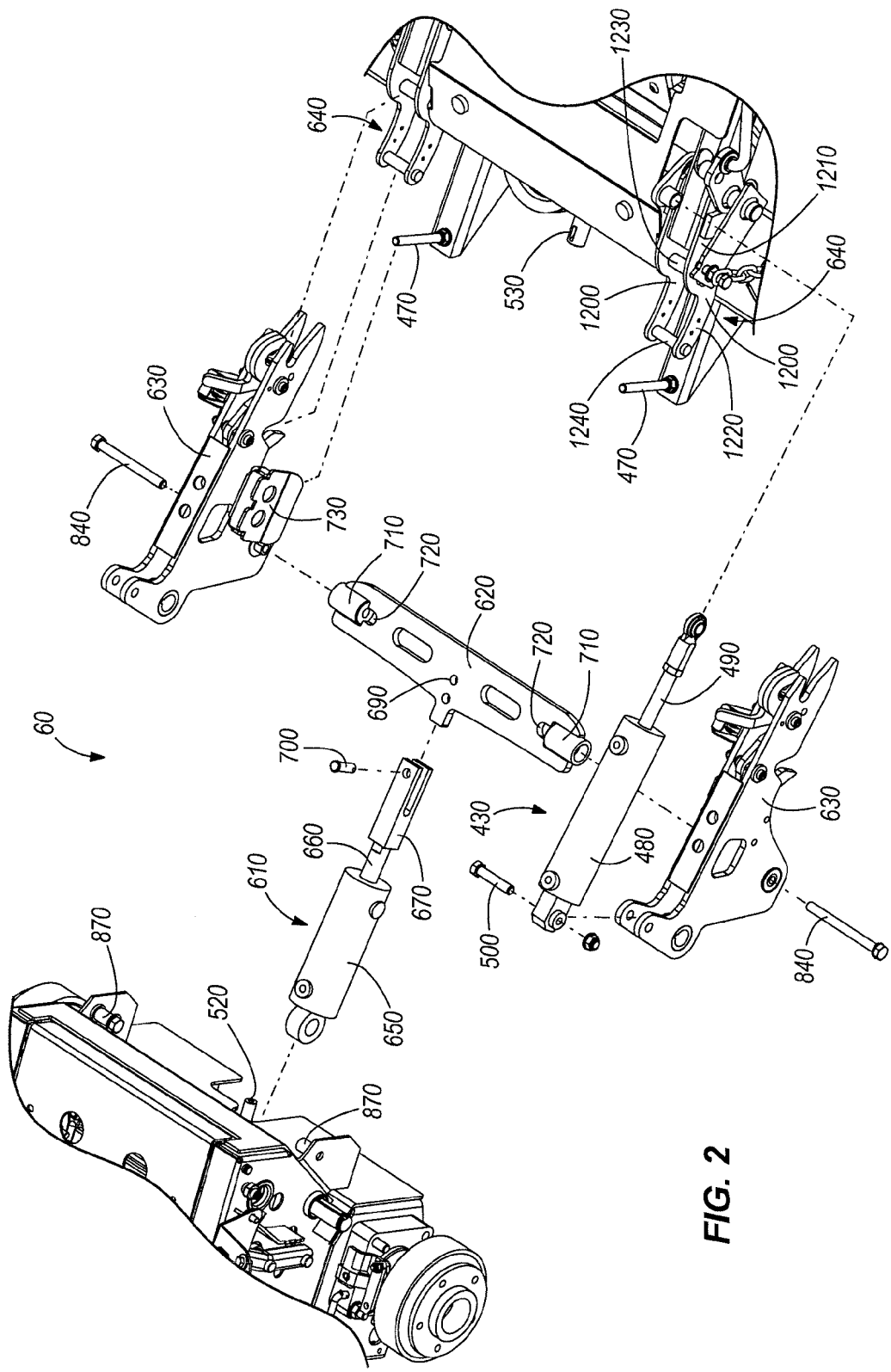
FIG. 2 is an exploded view of the weight transfer assembly.

With reference to FIG. 2, the deck lift actuator 430 includes a cylinder 480 and an extensible rod 490 that is extended and retracted with respect to the cylinder 480 under the influence of the tractor's hydraulic system 250. The cylinder 480 is pivotably mounted to a portion of the weight transfer assembly 60 with a pin, bolt, or other fastener 500 and the rod 490 is connected to the deck lift linkage 440. During ordinary operation of the lawn mower 10, the fastener 500 defines a horizontal pivot axis for the cylinder 480. Linear actuators (including the deck lift actuator 430 and the weight transfer actuator discussed below) are said to "extend" and "retract" when the rod is extended and retracted, respectively, with respect to the cylinder. The force with which a linear actuator extends the rod is referred to herein as the "extending force," and the force with which the actuator retracts the rod is referred to herein as the "retracting force."

Extension and retraction of the deck lift actuator 430 pushes and pulls, respectively, on the deck lift linkage 440. The deck lift linkage 440 converts the pushing and pulling action of the deck lift actuator 430 into rotational movement of pivotable members, which then convert the rotational movement into vertical movement of the cutting enclosure 450 and cutting blades 460 through chains or the like. Consequently, extension and retraction of the deck lift actuator 430 causes the cutting enclosure 450 and cutting blades 460 to raise and lower, respectively, with respect to the deck frame 410.

Referring again to FIG. 1, the cutting enclosure 450 includes a plurality of wheels 510 and is suspended from the deck lifting linkage 440 by the above-mentioned chains or the like. The cutting enclosure 450 is illustrated in the drawings as being fully raised (with its full weight being borne by the deck frame 410 and mower attachment wheels 420). When lowered by the deck lift actuator 430 through the deck lift linkage 440, the wheels 510 of the cutting enclosure 450 contact the ground, and the deck frame 410 and mower attachment wheels 420 may bear less, little, or none of the cutting enclosure weight.

The cutting blades 460 rotate under the influence of an auxiliary output shaft or driveshaft 520 (visible in FIG. 2) that is rotated under the influence of the prime mover 240, either through a transmission and gear box, or through the hydraulic system 250. The mower attachment 40 includes a power input shaft 530 (as illustrated in FIG. 2) and a torque-transmitting linkage, such as belts, that transfer rotation of the auxiliary output shaft 520 to the blades 460.

It should be noted that although the illustrated embodiment includes a mower attachment 40 mounted to the front of the vehicle, the invention described herein is also suited for use on other types of attachments, and for attachments mounted on other parts of the vehicle. Examples of alternative attachments include sprayers, booms, blades, buckets, forks, brushes, snow blowers, and chippers. All possible attachments in which the present invention may be embodied are encompassed by the term "attachments" in this disclosure.

Weight Transfer Assembly

The weight transfer assembly 60 interconnects the tractor 20 and mower attachment 40. The components of the weight transfer assembly 60 are best illustrated in FIG. 2, and include the weight transfer actuator 610, a cross-beam 620, left and right lift arm assemblies 630, and left and right mounting assemblies 640. The cross-beam 620, arm assemblies 630, and mounting assemblies 640 may be referred to collectively as a weight transfer linkage interconnecting the attachment frame 410 to the tractor frame 210.

Weight Transfer Actuator

The weight transfer actuator 610 has a cylinder 650 and extensible rod 660, and operates through the hydraulic system 250. The extensible rod 660 of the weight transfer actuator 610 includes a clevis 670 that is pinned or otherwise fastened to the center of the cross-beam 620. The cylinder 650 is mounted to the tractor frame or chassis 210 with a mounting pin 680 (FIGS. 5 and 6) that defines a horizontal axis about which the cylinder 650 is pivotable.

Cross-beam

The cross-beam 620 is generally flat in the illustrated embodiment, and includes a weight transfer mounting hole 690 through which a pin 700 extends to connect the clevis 670 of the weight transfer actuator's rod 660. The clevis 670 extends along top and bottom surfaces of the cross-beam 620, and the cross-beam 620 is pivotable (at least within a limited range of motion) with respect to the clevis 670 about a vertical axis defined by the pin 700. The cross-beam 620 includes left and right ends having bushings or bearings 710, and small windows 720 into which a nut may be inserted (as described below).

Lift Arm Assemblies

Figure 3:
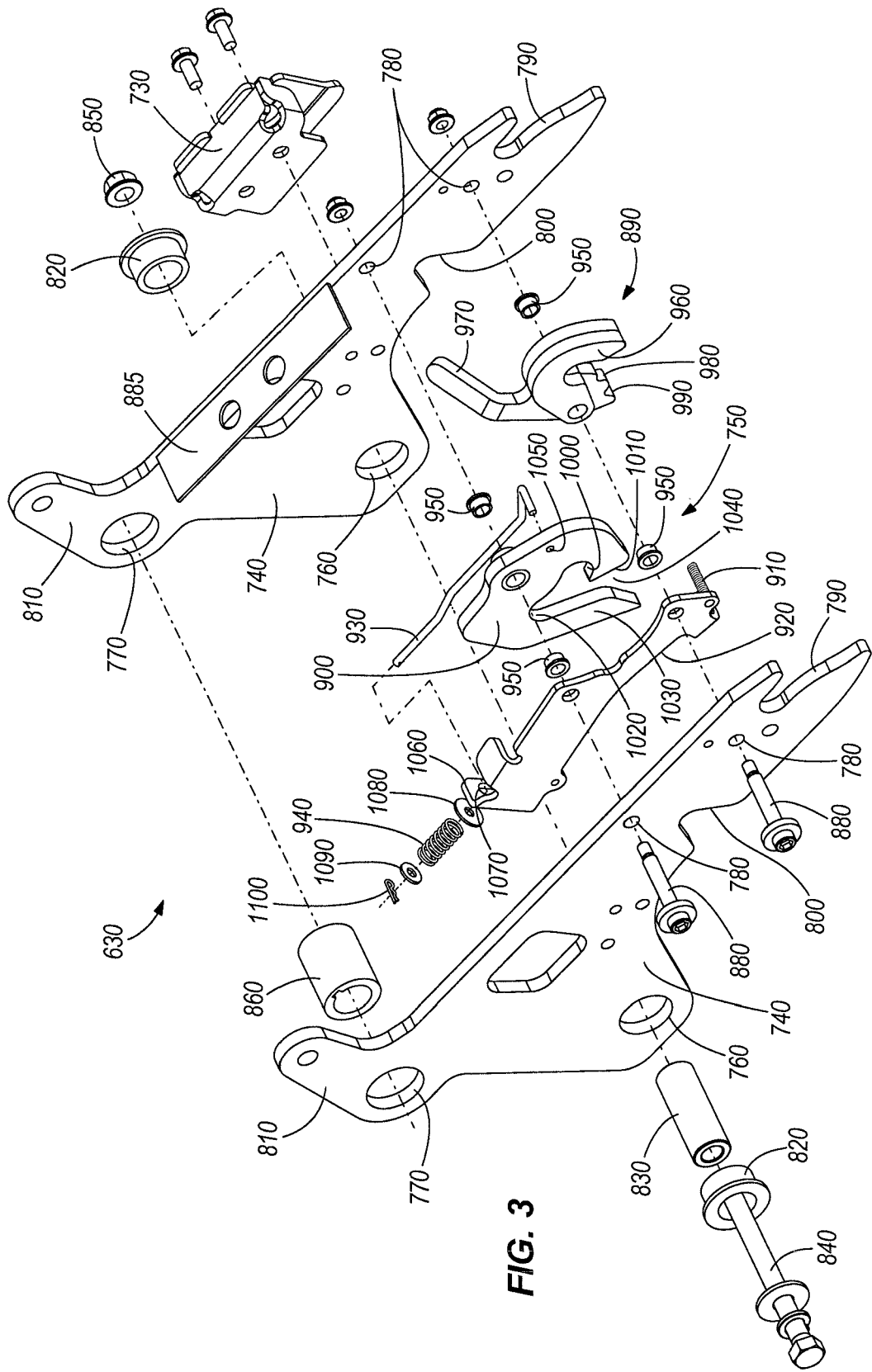
FIG. 3 is an exploded view of a lift arm assembly of the weight transfer assembly.

FIG. 3 illustrates the components of the right lift arm assembly 630, the left lift arm assembly being a substantial mirror image of the right lift arm assembly. The lift arm assembly 630 includes: a hard stop bracket 730, first and second generally flat and parallel lift arms or mounting arms 740, and a latching assembly 750.

The hard stop bracket 730 is mounted to an inner surface of each of the lift arm assemblies 630. The hard stop 730 provides a generally horizontal abutment surface that is positioned over an associated vertical stop member 470. During ordinary operation of the lawn mower 10, the vertical stop member 470 does not come into contact with the hard stop 730. However, if the lawn mower 10 is exposed to extreme conditions (e.g., the mower attachment 40 riding over a sudden bump), the vertical stop member 470 contacts the hard stop 730 to limit the downward travel of the weight transfer assembly 60 to prevent the cross-beam 620 from contacting and possibly damaging the auxiliary output shaft 520.

Each lift arm 740 includes a cross-beam mounting hole 760, a tractor mounting hole 770, two latch mounting holes 780, a first cut-out 790, a second cut-out 800, and a vertical tongue 810. The cross-beam mounting holes 760 each accommodate a bearing or bushing 820, and a spacer 830 extends between the bushings 820. A bolt 840 extends through the bushings 820 and spacer 830, and (with reference to FIG. 2), extends through the bushing 710 at one end of the cross-beam 620. A nut 850 is threaded onto the end of the bolt 840 within the small window 720 in the cross-beam 620.

A bearing or bushing 860 is also provided in the tractor mounting holes 770. The bushing 860 receives an attachment mounting structure or bar 870 (see FIG. 2, there is an attachment mounting bar 870 on each side for the respective arm assemblies 630) on the tractor 20, such that the lift arm assembly 630 is pivotably supported on the attachment mounting bar 870. The attachment mounting structure 870 is part of the tractor frame 210 or is rigidly mounted to the tractor frame 210. As will be discussed in more detail below, the lift arm assemblies 630 pivot about the attachment mounting bars 870 to convert linear force from the weight transfer actuator 610 into a weight lifting force applied to the mower attachment 40, and in this regard the lift arm assemblies 630 may be referred to as pivotable members.

Shoulder bolts 880 or other support members extend through the latch mounting holes 780 to pivotably support latches (discussed below) in the latching assembly 750. During ordinary operation of the lawn mower 10, the cross-beam mounting bolts 840, shoulder bolts 880, and the attachment mounting bars 870 define generally horizontal pivot axes about which the respective cross-beam 620, latches (discussed below), and lift arm assembly 630 can pivot.

The first cut-out 790 in each lift arm 740 opens generally forwardly, and the second cut-out 800 opens downwardly. Each latch mounting hole 780 is rearward of and generally above one of the first and second cut-outs 790, 800. The first and second cut-outs 790, 800 cooperate with latches (discussed below) in the latching assembly 750 to secure the lift arm assemblies 630 to the mounting assemblies 640, as will be discussed in detail below.

The vertical tongues 810 include mounting holes to which the cylinder end 480 of the deck lift actuator 430 is pinned 500 for pivotal movement about a horizontal axis. Thus, the deck lift actuator 430 is carried by a portion of the weight transfer linkage and is interconnected to the deck lift linkage. In some embodiments, (such as that shown), a single deck lift actuator 430 mounted to one of the lift arm assemblies 630 provides sufficient force to raise the cutting enclosure 450 through the deck lift linkage 440, in which case there is no deck lift actuator 430 mounted to the other lift arm assembly 630. In other embodiments that have larger, heavier cutting enclosures (e.g., in a mower attachment with a 72 inch cutting deck), a second deck lift actuator 430 may be pinned to the other lift arm assembly 630 to provide additional lifting force. For the sake of manufacturing economies, all lift arms 740 may include the vertical tongues 810. A plate 885 may be welded or otherwise affixed across the top edges of the two lift arms 740 in each lift arm assembly 630 for dimensional stability.

Each latching assembly 750 includes the following basic elements: a first latch 890, a second latch 900, a detent spring 910, a side bar 920, an over-center link 930, and an over-center spring 940. The first and second latches 890, 900 are pivotably supported on the shoulder bolts 880 with bushings 950.

The first latch 890 includes a first hook 960, a lever 970 extending generally vertically during operation, and first and second detent grooves 980, 990. The first latch 890 is pivotable about its pivot axis (i.e., the longitudinal axis of the associated shoulder bolt 880) between a latched position illustrated in FIGS. 4B, 4C, and 4D and an unlatched position illustrated in FIGS. 4A and 4E. When the first latch 890 is in the latched position, the detent spring 910 is received in the first detent groove 980, and when the first latch 890 is in the unlatched position, the detent spring 910 is received in the second detent groove 990. The first latch 890 is manually pivotable between the latched and unlatched positions by applying a rotating force to the first latch 890 through the lever 970. As the first latch 890 is pivoted, the detent spring 910 deflects, rides out of one of the detent grooves 980, 990, and snaps into the other detent groove 980, 990 to resist movement of the first latch 890 from the latched or unlatched position.

The second latch 900 includes a second hook or operational hook 1000, a cam surface 1010, a reset hook 1020, a reset jaw 1030, a slot 1040 between the cam surface 1010 and reset jaw 1030, and an over-center mounting hole 1050 that receives and end of the over-center link 930. The side bar 920 is mounted to one of the lift arms 740 through suitable means such as fasteners or welding, or may simply be supported by the shoulder bolts 880 that extend through the side bar 920. The side bar 920 includes a rear flange 1060 having a hole 1070 in it through which the over-center link 930 extends. The over-center link 930 extends through a first washer 1080, the over-center spring 940, and a second washer 1090. A cotter pin 1100 extends through the end of the over-center link 930, and abuts against the second washer 1090. The over-center spring 940 is sandwiched between the first and second washers 1080, 1090, and the first washer 1080 abuts against the back side of the flange 1060.

The length of the over-center link 930 is chosen to be slightly less than the shortest distance between the over-center mounting hole 1050 and the far end of the over-center spring 940 in an at-rest, uncompressed condition. This provides some compressive preload to the over-center spring 940, which pushes against the back side of the flange 1060 (through the first washer 1080) and against the cotter pin 1100 (through the second washer 1090) to thereby bias the link 930 to the left in FIGS. 4A-4E.

Because the link 930 is attached at its opposite end to the over-center mounting hole 1050, the link 930 is placed in a state of tension by the over-center spring 940, and a line of force (as illustrated with broken line 1110 in FIGS. 4B and 4C) extends between the opposite ends of the over-center link 930 (i.e., between the cotter pin 1100 and the over-center mounting hole 1050). The over-center link 930 is non-linear, such that the line of force 1110 does not extend along the over-center link 930. When the line of force 1110 is below the pivot axis (i.e., the longitudinal axis of the associated shoulder bolt 880) for the second latch 900, the over-center spring 940 biases the second latch 900 into a latched position illustrated in FIG. 4B, and when the line of force 1110 is above the pivot axis 880, the over-center spring 940 biases the second latch 900 to an unlatched position illustrated in FIG. 4C.

Mounting Assemblies

Referring again to FIG. 2, the left and right mounting assemblies 640 are substantially identical to each other, and to avoid crowding in the drawing, reference numerals are only provided for one of the mounting assemblies 640. Each mounting assembly 640 includes first and second generally flat and parallel mounting arms 1200. The mounting arms 1200 are curved to define an upper portion 1210 and a lower portion 1220. An upper mounting peg 1230 extends between the upper portions 1210 of the mounting arms 1200 and a lower mounting peg 1240 extends between the lower portions 1220 of the mounting arms 1200. The upper and lower mounting pegs 1230, 1240 are rigidly affixed to the mounting arms 1200. The upper portions 1210 of the mounting arms 1200 are mounted to the deck frame 410.

Operation of Latching Assembly

To attach an attachment to a vehicle, the vehicle is driven to place the lift arm assemblies 630 proximate and generally perpendicular to the mounting pegs 1230, 1240 of the mounting assemblies 640. When the attachment is not attached to the vehicle, the upper mounting pegs 1230 are generally below the height of the first cut-outs 790 in the lift arms 740 when the lift arms 740 extend horizontally. Consequently, the lift arm assemblies 630 must be pivoted downwardly (i.e., clockwise in FIG. 4A) by operation of (i.e., retraction of) the weight transfer actuator 610 to align the openings of the first cut-outs 790 with the upper mounting pegs 1230. Below is a description of the steps for mounting and disconnecting an attachment to a vehicle through the latching assemblies 750. For the sake of convenience, the description refers to only one of the latching assemblies 750 (as illustrated in FIGS. 4A-4E), it being understood that there is a second latching assembly 750 on the other lift arm assembly 630 following essentially identical steps as that being described.

Figure 4A:
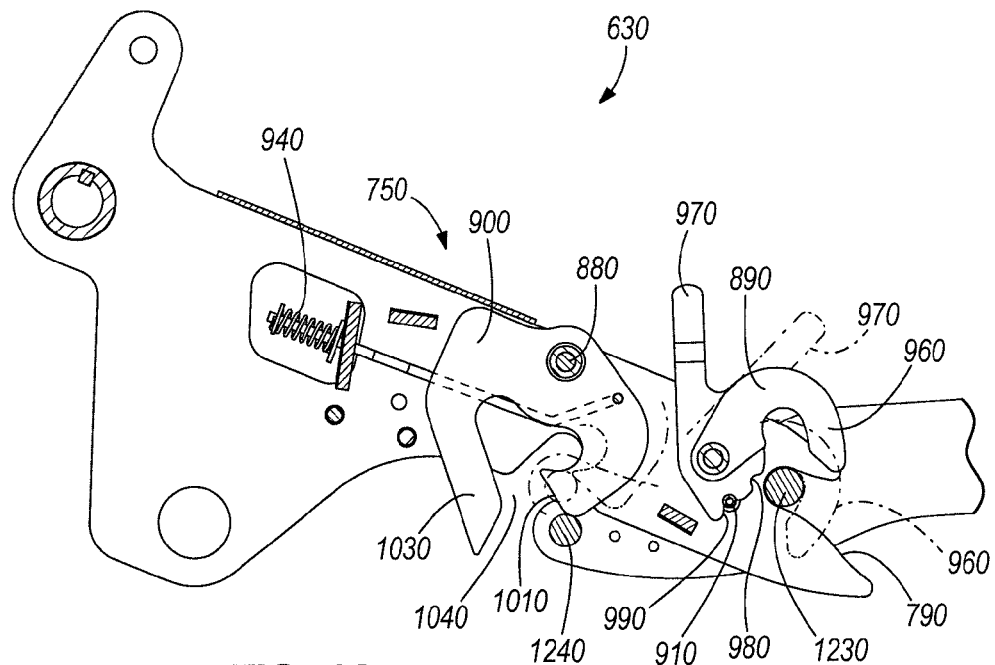
FIGS. 4A-4E are side views of a latching mechanism portion of the lift arm assembly, showing a sequence of steps used to couple the mower attachment to, and decouple the mower attachment from, the tractor.

With reference to FIG. 4A, with the first latch 890 in the unlatched position, the attachment is pushed toward the vehicle to move the upper mounting peg 1230 into the first cut-out 790. Then the first latch 890 is manually pivoted into the latched position (as illustrated in phantom in FIG. 4A) by grasping the lever 970 and pivoting the first latch 890, such that the detent spring 910 rides out of the second detent 990 and snaps into the second detent 980. Once in the latched position (illustrated in phantom in FIG. 4A and solid lines in FIG. 4B), the first latch 890 captures the upper mounting peg 1230 in the first cut-out 790 with the first hook 960. The weight transfer actuator 610 is then extended to pivot the lift arm assemblies 630 upwardly (i.e., counterclockwise in FIG. 4A), which brings the lower mounting peg 1240 into engagement with the cam surface 1010 on the second latch 900. Continued pivoting of the lift arm assemblies 630 causes the second latch 900 to deflect (as shown in phantom in FIG. 4A) against the biasing force of the over-center spring 940 as the lower mounting peg 1240 rides along the cam surface 1010 in the slot 1040 of the second latch 900.

Figure 4B:
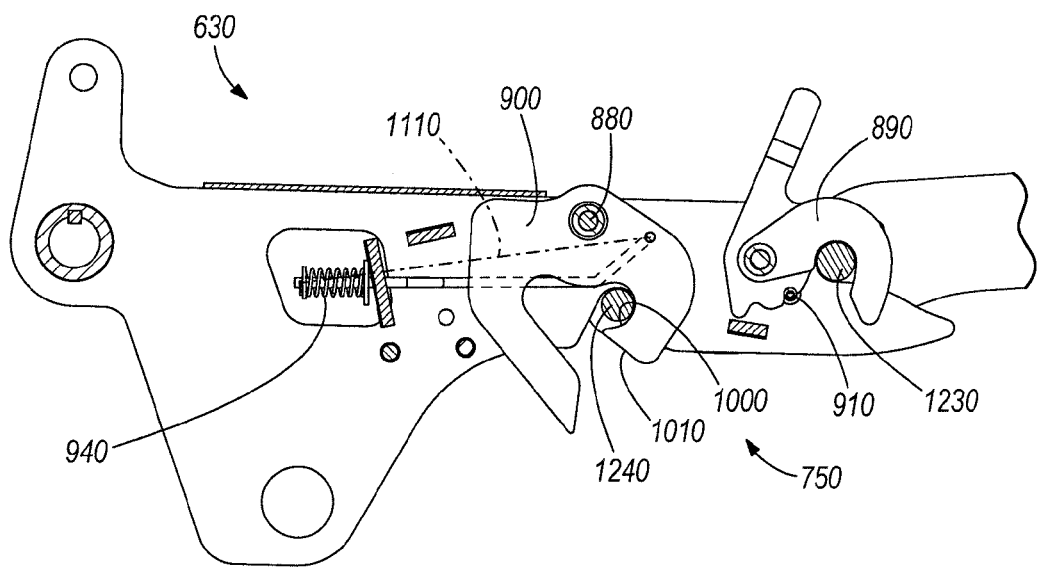

With reference to FIG. 4B, once the lift arm assemblies 630 have pivoted upwardly far enough for the lower mounting peg 1240 to clear the cam surface 1010, the biasing force of the over-center spring 940 (acting under the pivot axis 880 of the second latch 900) causes the second latch 900 to snap back and engage the lower mounting peg 1240 in the second hook 1000. The upper and lower mounting pegs 1230, 1240 are now secured in the respective first and second cut-outs 790, 800 and the attachment is mounted to the vehicle through the weight transfer assembly 60.

Figure 4C:
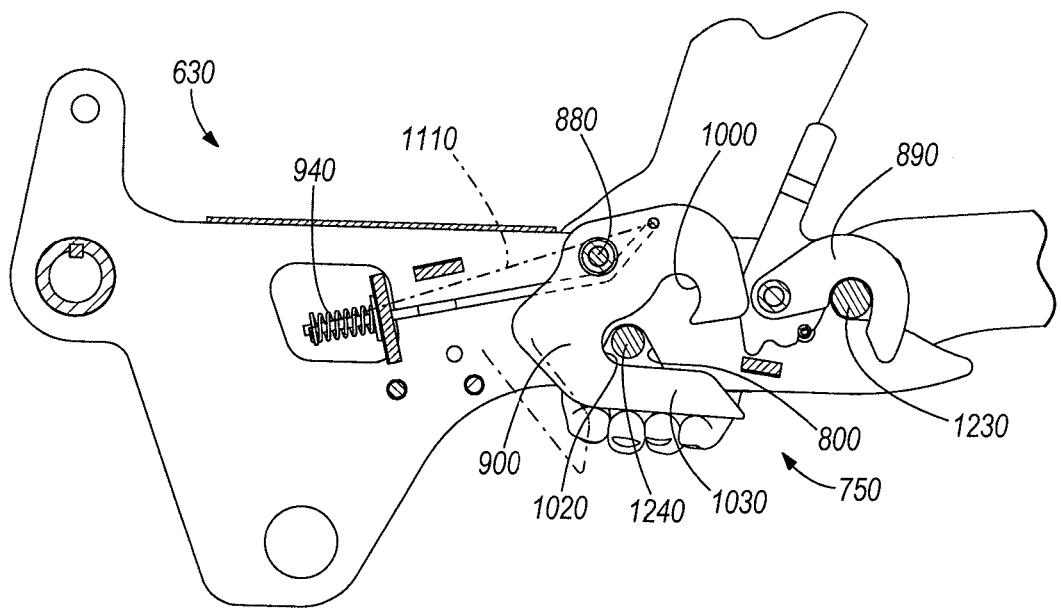

With reference to FIG. 4C, the attachment is disconnected from the vehicle by first manually pivoting the second latch 900 toward the unlatched position, by pushing upwardly on the reset jaw 1030. As the second latch 900 is pivoted upwardly, the line of force 1110 rises above the pivot axis 880, and the over-center spring 940 biases the second latch 900 toward the unlatched position. In the unlatched position, the lower mounting peg 1240 is received in the reset hook 1020, as illustrated in FIG. 4C.

Figure 4D:
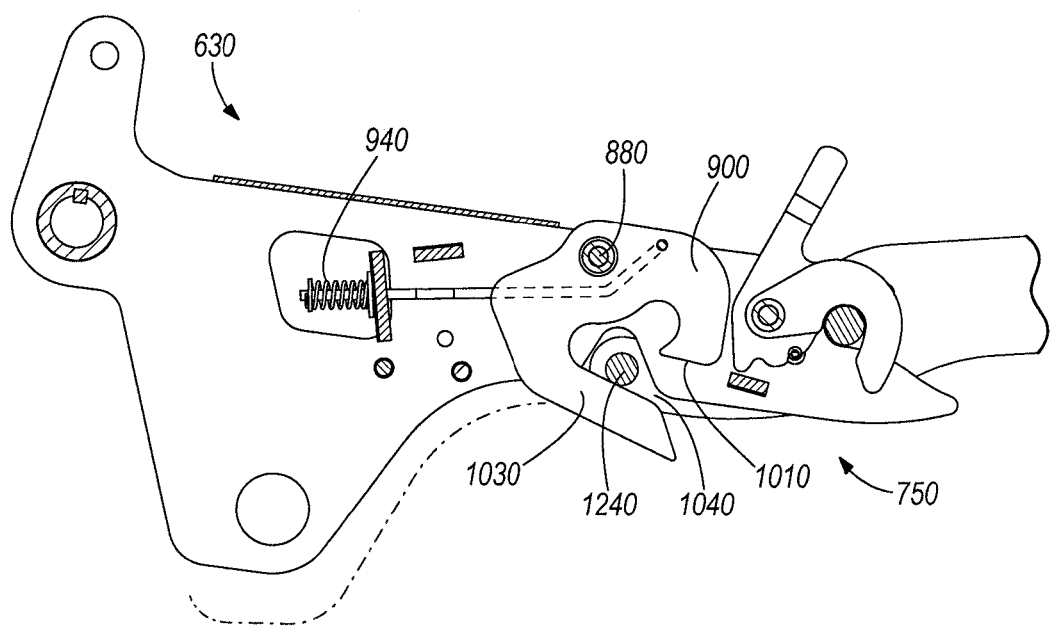

With the lower mounting peg 1240 in the reset hook 1020, the weight transfer actuator 610 pivots the lift arm assemblies 630 down, as illustrated in FIG. 4D. As the lift arm assemblies 630 pivot down, the lower mounting peg 1240 rides along the reset jaw 1030 and pivots the second latch 900 clockwise. Simultaneously, the line of force 1110 is lowered until it is under the pivot axis 880 (it is roughly even with the pivot axis 880 in FIG. 4D, and about to go under center). When the second latch 900 has pivoted sufficiently to move the line of force 1110 under the pivot axis 880, the biasing force of the over-center spring 940 pivots the second latch 900 into the latched position, but the lower mounting peg 1240 is within the slot 1040 between the cam surface 1010 and the reset jaw 1030. A portion of the second latch 900 may abut the plate 885 extending across the top edges of the lift arms 740 (see FIG. 4E) to ensure that the slot 1040 opens at an angle appropriate for removing the peg 1240 as the lift arm assemblies 630 pivot down.

Figure 4E:
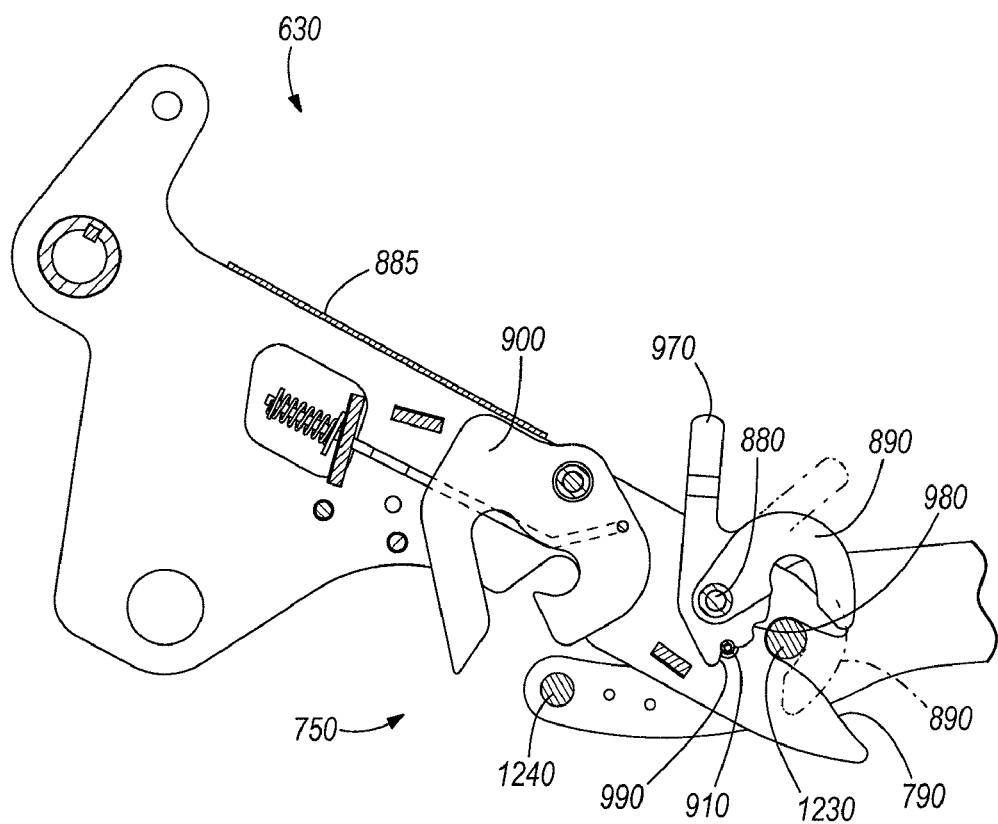

With reference to FIG. 4E, the weight transfer actuator 610 continues to pivot the lift arm assemblies 630 down until the lower mounting peg 1240 is completely clear of the second latch 900, and the attachment is resting on the ground or another stable support surface. At that time, the first latch 890 is pivoted into the unlatched position by pulling back on the lever 970, pivoting the first latch 890 counterclockwise, and causing the detent spring 910 to ride out of the first detent 980 and into the second detent 990. Once the first latch 890 is in the unlatched position, the vehicle may be backed away from the attachment or the attachment may be moved away from the vehicle to remove the upper mounting peg 1230 from the first cut-out 790.

Operation of the Weight Transfer Assembly

Figure 5:
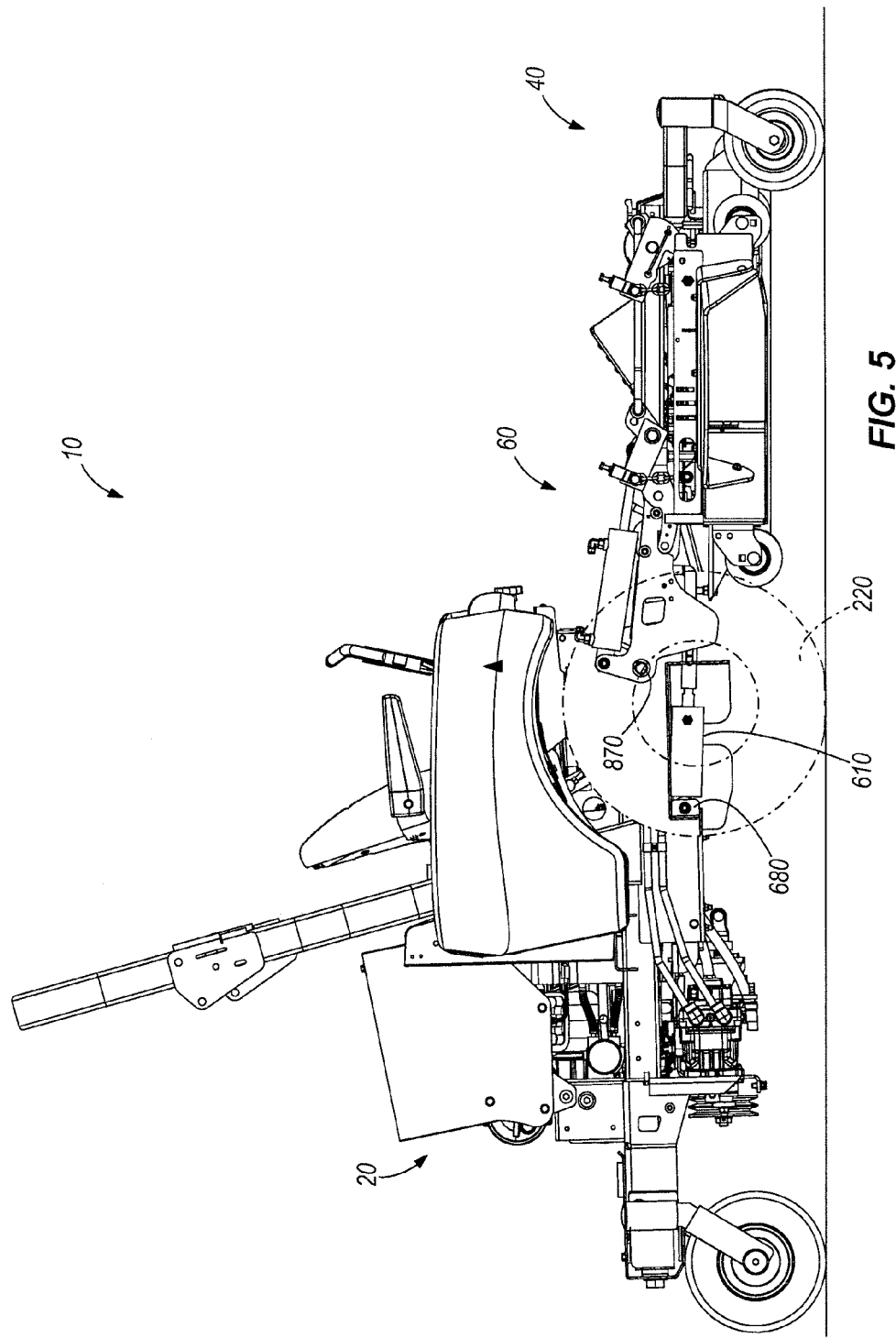
FIG. 5 is a side view of the lawn mower in which minimum weight of the mower attachment is transferred to the tractor.
Figure 6:
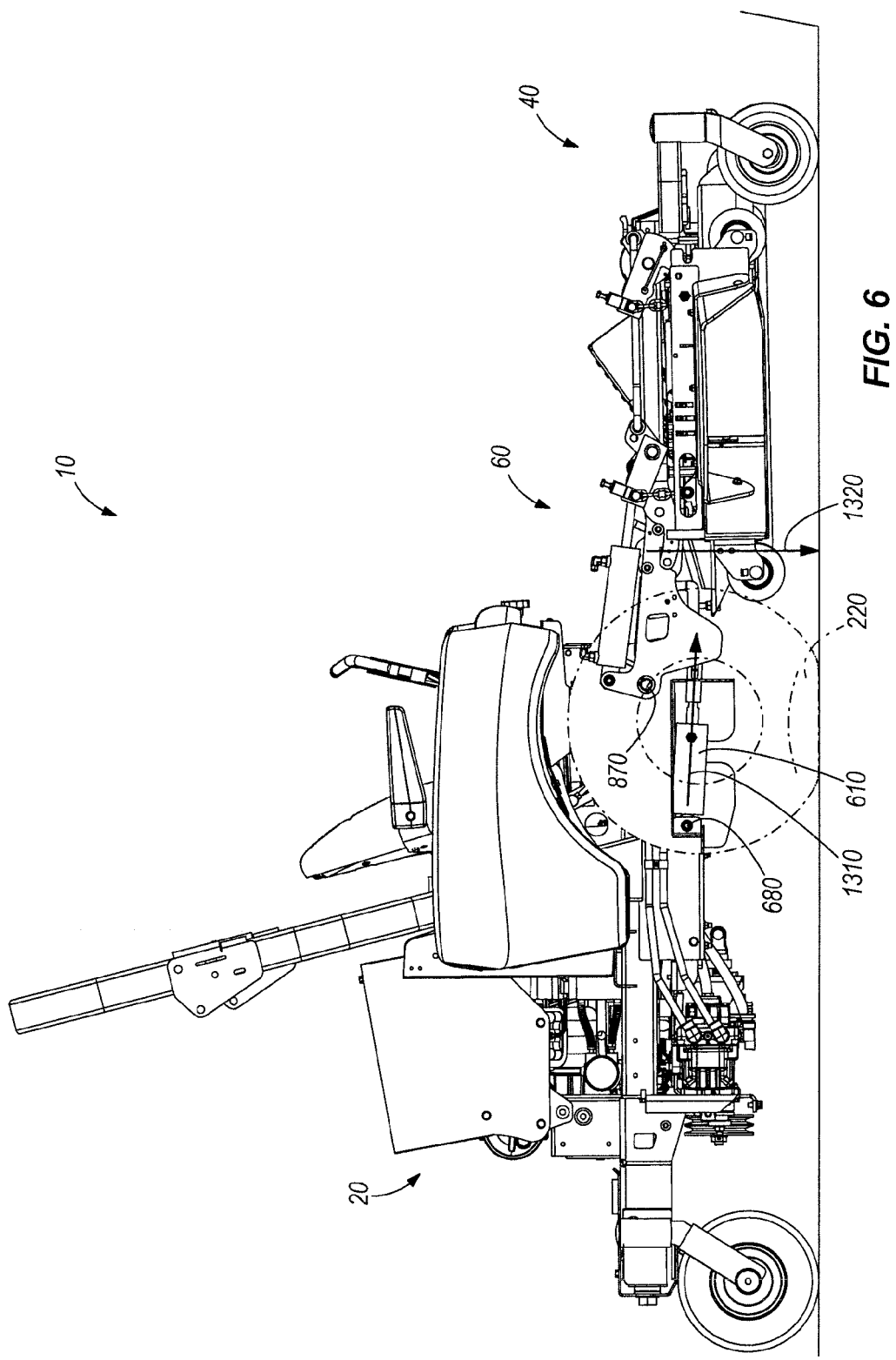
FIG. 6 is a side view of the lawn mower in which maximum weight of the mower attachment is transferred to the tractor.

With reference to FIGS. 5 and 6, the weight transfer assembly 60 is actuated to transfer a selected amount of weight of the mower attachment 40 to the front wheels 220 of the tractor 20. FIG. 5 illustrates the weight transfer actuator 610 retracted such that minimal weight is transferred, and FIG. 6 illustrates the weight transfer actuator 610 extended such that weight transfer is maximized. The full range of motion of the weight transfer actuator 610 and all other components in the weight transfer assembly 60 is defined between the positions illustrated in FIGS. 5 and 6. As can be seen by comparing the angles of the weight transfer actuator 610 at the opposite ends of the range of motion, the actuator 610 is generally angled slightly under horizontal, and thus the extending and retracting forces exerted by the actuator 610 on the weight transfer assembly 60 is generally horizontal or angled slightly down from horizontal.

The weight transfer actuator 610 applies a generally horizontal force (see arrow 1310 in FIG. 6) against generally vertical portions of the lift arm assemblies 630, which gives rise to a torque that causes the lift arm assemblies 630 to pivot clockwise or counterclockwise about the attachment mounting bars 870 (counterclockwise in the specific example of FIG. 6). The torque is offset by that portion of the mower attachment's weight necessary to create an equal and opposite torque on the lift arm assemblies 630, except that the mower attachment weight is directed vertically (specifically, down, see arrow 1320 in FIG. 6) against a generally horizontal portion of the lift arm assemblies 630.

The torque is offset, which prevents the lift arm assemblies 630 from pivoting, and the vertically-applied weight of the attachment borne by the lift arm assemblies 630 is transferred through the attachment mounting bars 870 down through the vehicle frame 210, to the front wheels 220. As wheels 220 bear more weight, the tires deflect and traction is improved.

The attachment mounting bars 870 are forward of the tractor's center of mass (and, indeed, forward of the front wheel 220 axels in the illustrated embodiment). The transfer of mower attachment weight 1320 to the attachment mounting bars 870 has the effect of moving the tractor's center of mass forward toward the front wheels 220. As more weight is transferred, the center of mass moves further forward. As the center of mass moves forward, the front wheels 220 bear more and more weight, and as weight is transferred to the front tractor wheels 220, the front wheels 220 are given more traction with the ground. Under certain circumstances (e.g., uphill and level travel), having additional traction in the front wheels 220 may be desirable to an operator of the lawn mower 10 or other vehicle.

As a necessary result of moving the center of mass of the tractor 20 forward, less weight is borne by the rear wheels 230. Under certain circumstances, it may be desirable to an operator of the lawn mower 10 or other vehicle to have the center of mass moved rearward to transfer more weight to the rear wheels 230. During downhill travel, for example, moving the center of mass rearwardly to transfer weight back to the rear wheels 230 may add to the overall riding comfort of the lawn mower 10. Thus, retracting the weight transfer actuator 610 during downhill travel may be beneficial to operator experience. To the extent permitted by the weight transfer actuator's retraction force, the rod 660 may be retracted into the cylinder 650 sufficiently to actually push down on the mower attachment 40 though the weight transfer assembly 60, in which case, some portion of the weight of the tractor 10 may actually be transferred to the rear wheels 230 of the tractor 10 and to the mower attachment wheels 420.

Hydraulic System

Figure 7:
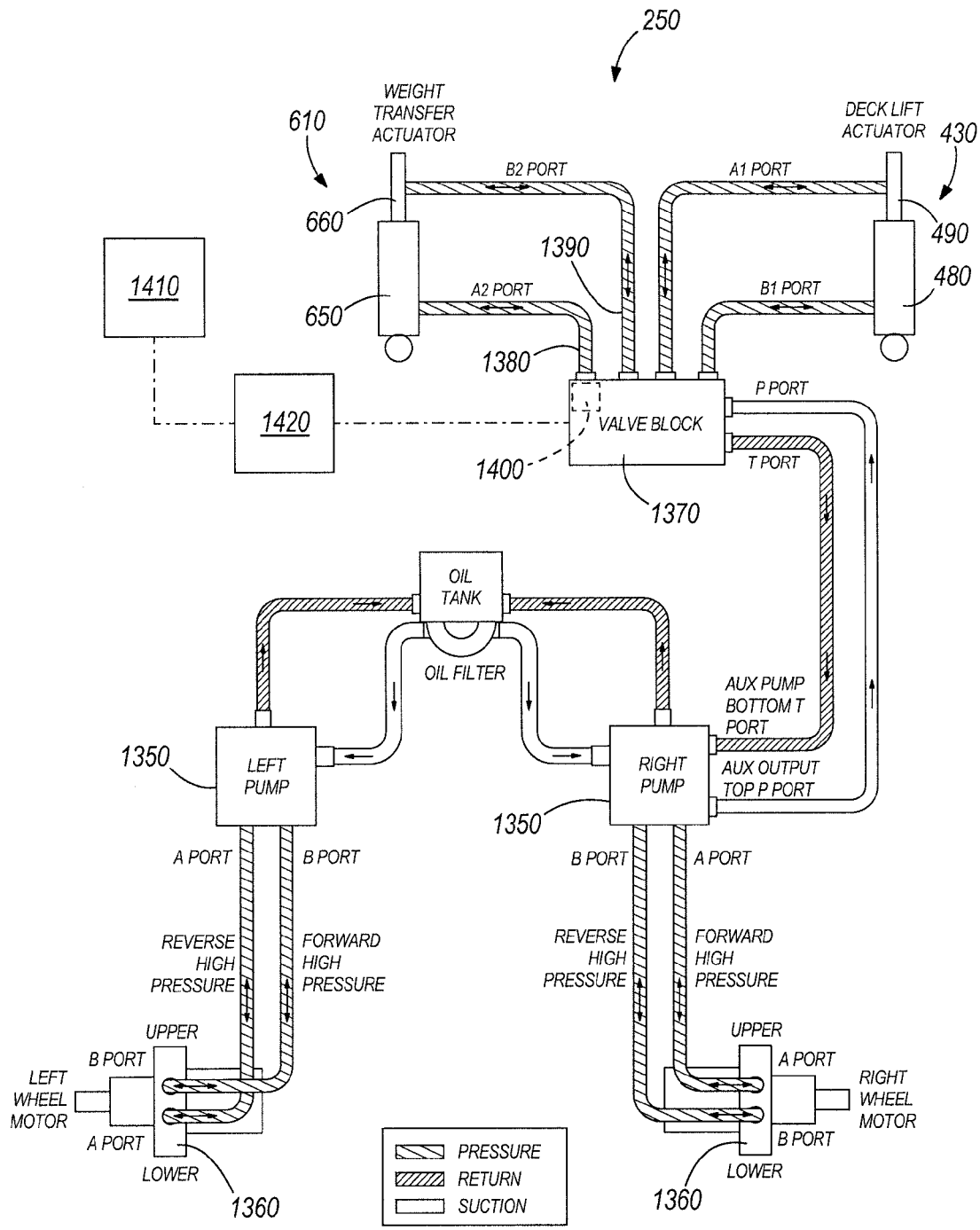
FIG. 7 is a schematic representation of the tractor hydraulic and control system.

FIG. 7 schematically illustrates a simplified diagram of the hydraulic system 250, which includes one or more hydraulic pumps 1350 that are driven by the prime mover 240 to create a flow of hydraulic fluid. The hydraulic system is a hydrostatic drive system, and includes left and right hydraulic motors 1360 that are associated with the respective left and right front wheels 220 of the tractor 20. Each hydraulic motor 1360 drives rotation of the associated front wheels 220, at a speed and direction of rotation determined by the speed and direction or rotation of the motor 1360. In one embodiment, the left and right control sticks 280 are attached to swash plates in the respective left and right motors 1360 to control the speed and direction of rotation of the motors 1360 and wheels 220.

The hydraulic system 250 includes a valve block 1370 that receives hydraulic fluid from the right pump 1360. The valve block 1370 controls hydraulic fluid flow to the deck lift actuator 430 and the weight transfer actuator 610 in response to manipulation of respective deck lift and weight transfer switches in the operator zone 260 (e.g., on the control panel 290 or on the control sticks 280).

Both the deck lift actuator 430 and the weight transfer actuator 610 have pistons attached to the rods 490, 660, and reciprocating within the cylinders 480, 650. The pistons divide the cylinders 480, 650 into a "rod side" and a "cylinder side." The "rod side" is that portion of the cylinder surrounding a portion of the rod, and the "cylinder side" is the portion of the cylinder on the opposite of the piston from the rod side. Both the deck lift actuator 430 and the weight transfer actuator 610 are so-called "double acting" actuators because the valve block 1370 selectively directs hydraulic fluid under pressure to the rod side and cylinder side.

The extending and retracting forces are functions of the hydraulic pressure multiplied by the working surface area of the piston against which the hydraulic pressure is applied. On the cylinder side, the working surface area is the full surface area of the piston, while the working surface area on the rod side is the full surface area of the piston minus the cross-sectional area of the rod. The extending force is therefore greater than the retracting force for a double acting actuator if hydraulic fluid is supplied at equal pressure to the cylinder and rod sides of the actuator.

In the illustrated embodiment, the valve block 1370 communicates with the rod side of the weight transfer actuator through a rod side port 1380, and communicates with the cylinder side of the weight transfer actuator 610 through a cylinder side port 1390. An adjustable relief valve 1400 is included in the valve block 1370 to reduce the pressure at which hydraulic fluid is provided to the cylinder side and rod side 650, 660 of the weight transfer actuator. The extending and retracting force of the weight transfer actuator 610 are therefore reduced as a function of the reduction in pressure created by the adjustable relief valve 1400.

The adjustable relief valve 1400 may be adjusted to cap the extending and retracting force of the weight transfer actuator 610 for a given vehicle and attachment. It may be desirable to cap the extending and retracting force of the weight transfer actuator 610 to cap the amount of weight that can be transferred to the vehicle, and thereby limit the extent to which the center of mass of the vehicle can be moved forward.

In some embodiments, the retracting force may be so limited by the adjustable relief valve 1400 that the weight transfer actuator 610 has only enough retracting force to pivot the lift arm assemblies 630 down during attachment and detachment of the mower attachment 40, but once the mower attachment 630 is attached to the weight transfer assembly 60, the weight transfer actuator 610 is unable to transfer any significant portion of the tractor's 10 weight to the attachment wheels 420. In such embodiments, the mower attachment is permitted to float over rough terrain. Because the extension force is higher than the retraction force, the weight transfer actuator 610 may in such embodiments still be able to extend and transfer weight of the mower attachment to the front wheels 220 of the tractor 20.

In one example, the right pump 1350 of the hydraulic system 250 may provide hydraulic fluid at operating pressures around 600 psi, and the adjustable relief valve 1400 may be set to provide hydraulic fluid to the weight transfer actuator 610 at pressures of only about 250-300 psi. In this example, the extending and retracting force of the weight transfer actuator 610 would be reduced by about half or a little more than half.

Control System

The weight transfer actuator 610 may be controlled through a manual controller in the operator zone 260, for example, but may also be automatically controlled by a control system that incorporates a lawn mower tilt sensor 1410. One example of a lawn mower tilt sensor apparatus and method that may be suitable for controlling the weight transfer actuator is disclosed in U.S. Pat. No. 6,983,583, issued Jan. 10, 2006, and assigned to the assignee of the present invention. The entire contents of U.S. Pat. No. 6,983,583 are incorporated herein by reference. The tilt sensor 1410 in that patent is generally concerned with side-to-side roll of the vehicle, but could be provided with functionality to sense forward and backward pitch of the vehicle.

With reference to FIG. 7, the control system may include a tilt sensor 1410 that measures the pitch of the vehicle. As used herein, "pitch" means the degree to which the longitudinal axis of the vehicle is angled with respect to a horizontal plane. If, for example, the lawn mower 10 is traveling uphill, the front wheels 220 are above the rear wheels 230 and the longitudinal axis of the lawn mower 10 is "pitched upwardly," and if the lawn mower 10 is traveling downhill, the front wheels 220 are below the rear wheels 230 and the lawn mower 10 is "pitched downwardly." The tilt sensor 1410 can be of a type that produces an actual reading of the pitch angle, or one that only indicates whether the lawn mower's pitch at any given time is higher or lower than various pitch angles at which actuation (extension or retraction) of the weight transfer actuator 610 would be desirable.

The tilt sensor 1410 provides signals to a controller 1420 in response to various pitch conditions of the lawn mower 10. In response to receiving the signals, the controller 1420 operates the weight transfer actuator 610 (through the valve block 1370) to transfer more or less weight of the mower attachment 40 to the tractor 20 as conditions merit. The tilt sensor 1410, controller 1420, and weight transfer actuator 610 may operate in binary fashion or proportional fashion.

As used herein, "binary" means that the sensor, controller, or actuator merely have on and off modes. For example, if the tilt sensor 1410 operates in binary fashion, it merely indicates whether or not a pitch angle is achieved. If the controller 1420 and actuator 610 operate in binary fashion, they seek to fully extend or fully retract the actuator 610, but are not able to balance hydraulic fluid and pressure to partially extend or retract the actuator 610. As used herein, "proportional" means that the sensor 1410 can sense or measure multiple pitch angles or thresholds or measure a precise angle of pitch at any given time, and means that the controller 1420 can operate the actuator 610 to partially and adjustably extend and retract. Regardless of whether the pitch sensor 1410 operates in binary or proportional fashion, however, the pitch sensor 1410 senses a pitch condition of the lawn mower 10.

For example, if operating in binary fashion, the pitch sensor 1410 generates a first signal in response to sensing a pitch in excess of a threshold uphill angle, and the controller 1420 causes the valve block 1370 to maximize flow and pressure to the cylinder side 650 of the actuator 610. The pitch sensor 1410 also generates a second signal in response to sensing a pitch angle in excess of a threshold downhill angle, and removes the flow and pressure from the cylinder side 650 to permit the mower attachment to free-float without the application of any force through the weight transfer linkage. In a manual override mode, the operator may flip a switch or other toggle device (e.g., the weight transfer switch or dial on the control panel 290 or control levers 280) to engage or disengage the weight transfer actuator 610.

In another example, in which the pitch sensor 1410, controller 1420, and actuator 610 operate in proportional mode, the pitch sensor 1410 generates a signal corresponding to a particular angle or a discrete range of angles, and the controller 1420 extends or retracts the weight transfer actuator 610 in proportion to the degree of the uphill climb, as sensed by the pitch sensor 1410.

The control system may also include a user interface (e.g., in the control panel 290) through which an operator of the vehicle may manually override the control unit 1420 and transfer more or less weight at the operator's discretion. The control system may be toggled between automatic and manual modes by toggling a control mode switch to give control to the control unit 1420 or the operator. Additional pitch alerts, such as auditory and visual alerts, may be provided to alert the operator that a threshold pitch angle has been met.

Thus, the invention provides, among other things, a vehicle having an attachment and a weight transfer assembly operable to selectively transfer weight from the attachment to the vehicle. Various features and advantages of the invention are set forth in the following claims.

The invention claimed is:

1. An apparatus for connecting an attachment to a vehicle, the apparatus comprising:
   first and second mounting pegs mounted to one of the attachment and vehicle;
   a mounting arm having first and second cut-outs sized and spaced to receive the respective first and second mounting pegs;
   a first latch pivotable between a latched position in which the first mounting peg is trapped in the first cut-out, and an unlatched position in which the first mounting peg is removable from the first cut-out;
   a second latch pivotable about a pivot axis between a latched position in which the second mounting peg is trapped in the second cut-out, and an unlatched position in which the second mounting peg is removable from the second cut-out;
   a detent mechanism resiliently holding the first latch in each of the latched and unlatched positions with a detent force; and
   an over-center biasing mechanism providing a biasing force along a line of force, the biasing force urging the second latch into the latched position in response to the line of force being on one side of the pivot axis and urging the second latch into the unlatched position in response to the line of force being on an opposite side of the pivot axis.

2. The apparatus of claim 1, wherein the first cut-out opens forwardly and the second cut-out opens downwardly.

3. The apparatus of claim 1, wherein the detent mechanism includes a deflectable member; a first detent groove in which the deflectable member is positioned in response to the first latch being in the latched position; and a second detent groove in which the deflectable member is positioned in response to the first latch being in the unlatched position; wherein the deflectable member resists movement out of the first and second detent grooves to resist movement of the first latch between the latched and unlatched positions; and wherein a manual pivoting force applied to the first latch overcomes the resistance to cause the deflectable member to ride out of one of the first and second detent grooves and into the other of the first and second detent grooves during manual adjustment of the first latch between the latched and unlatched positions.

4. The apparatus of claim 1, wherein the deflectable member includes a detent spring.

5. The apparatus of claim 1, wherein the over-center biasing mechanism includes an over-center link connected at a first end to the second latch; and a biasing spring connected to a second end of the link opposite the first end; wherein the biasing spring generates the biasing force directed along a line of force between the first and second ends of the link; and wherein pivoting the second latch moves the line of force across the pivot axis.

6. The apparatus of claim 5, wherein the over-center link is non-linear, such that the line of force does not extend along the over-center link.

7. The apparatus of claim 1, wherein the second latch includes a cam surface and operational hook; wherein the second mounting peg is received within the operational hook by abutting the second mounting peg against the cam surface to deflect the second latch out of the latched position against the biasing force but not into the unlatched position as the mounting peg is moved into the second latch; and wherein the biasing mechanism biases the second latch into the latched position to engage the second mounting peg with the operational hook in response to the second mounting peg clearing cam surface.

8. The apparatus of claim 7, wherein the second latch includes a reset hook, a reset jaw, and a slot between the reset jaw and the operational hook; wherein the second mounting peg is moved into engagement with reset hook in response to the second latch moving into the unlatched position; wherein the second mounting peg moves along the reset jaw and causes the second latch to move out of unlatched position toward latched position in response to moving the second mounting peg out of the second cut-out; and wherein the biasing mechanism moves the second latch toward the latched position with the second mounting peg in the slot in response to the second mounting peg moving along reset jaw out of second cut-out.

9. The apparatus of claim 1, wherein the mounting arm is a first mounting arm; the apparatus further comprising a second mounting arm; and wherein the first and second latches, the detent mechanism, and the over-center mechanism are positioned between the first and second mounting arms.

10. The apparatus of claim 9, wherein the detent mechanism includes a deflectable member extending between the first and second mounting arms and applying a detent force to the first latch to resist movement of the first latch out of the latched and unlatched positions; and wherein the detent force is overcome by manual pivoting of the first latch between the latched and unlatched.

11. The apparatus of claim 10, wherein the detent mechanism further includes first and second detent grooves into which the deflectable member is received in response to the first latch being in the respective latched and unlatched positions.

12. The apparatus of claim 1, wherein the first latch includes a lever for facilitating application of a manual pivoting force to the first latch to overcome the detent force and moving the first latch between the latched and unlatched positions.

* * * * *